United States Patent
Lee et al.

(10) Patent No.: US 8,510,008 B2
(45) Date of Patent: Aug. 13, 2013

(54) BRAKE SYSTEM AND METHOD

(75) Inventors: Hou-Hsien Lee, Tu-Cheng (TW); Chang-Jung Lee, Tu-Cheng (TW); Chih-Ping Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 248 days.

(21) Appl. No.: 13/080,672

(22) Filed: Apr. 6, 2011

(65) Prior Publication Data

US 2012/0022757 A1    Jan. 26, 2012

(30) Foreign Application Priority Data

Jul. 22, 2010   (TW) .................................. 99124126

(51) Int. Cl.
*B60T 8/172*    (2006.01)

(52) U.S. Cl.
USPC .................. 701/70; 188/24.12; 188/24.21

(58) Field of Classification Search
USPC .................. 701/70; 188/24.12, 24.15, 24.16, 188/24.22, 355, 356; 180/179, 206.2; 74/501.6, 502.2, 551.8; 482/5
See application file for complete search history.

(56) References Cited

U.S. PATENT DOCUMENTS

| | | | | | |
|---|---|---|---|---|---|
| 4,773,510 | A | * | 9/1988 | Sato | 188/24.16 |
| 5,602,448 | A | * | 2/1997 | Yaguchi | 318/139 |
| 2008/0114519 | A1 | * | 5/2008 | DuFaux et al. | 701/70 |
| 2010/0292886 | A1 | * | 11/2010 | Szczerba et al. | 701/29 |
| 2010/0312509 | A1 | * | 12/2010 | Patel et al. | 702/92 |

* cited by examiner

*Primary Examiner* — Marthe Marc-Coleman
(74) *Attorney, Agent, or Firm* — Altis Law Group, Inc.

(57) ABSTRACT

A brake system and method includes adjusting an electronic apparatus on a bracket of a bicycle to be in a horizontal state. If the bicycle is downsloped and a gradient value of the electronic apparatus exceeds or equals a predetermined gradient value, a brake operation of the bicycle is detected. If the brake operation is improper, a brake command is sent to a brake device of the brake system, and brake cables of a front wheel and/or a rear wheel of the bicycle are controlled by the brake device according to the brake command.

20 Claims, 8 Drawing Sheets

ABRAKE SYSTEM AND METHOD

BACKGROUND

1. Technical Field

Embodiments of the present disclosure relate to brake technology, and more particularly to a brake system and method of a bicycle.

2. Description of Related Art

The benefits of bicycle riding are well known; however, improper brake operations on the bicycle can present danger to the rider, such as when brakes are applied to a front wheel of the bicycle when descending a slope. Thus, a brake system and method for insuring cycling safety is desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, Java, C, or Assembly, for example. One or more software instructions in the modules may be embedded in firmware, such as an erasable programmable read only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
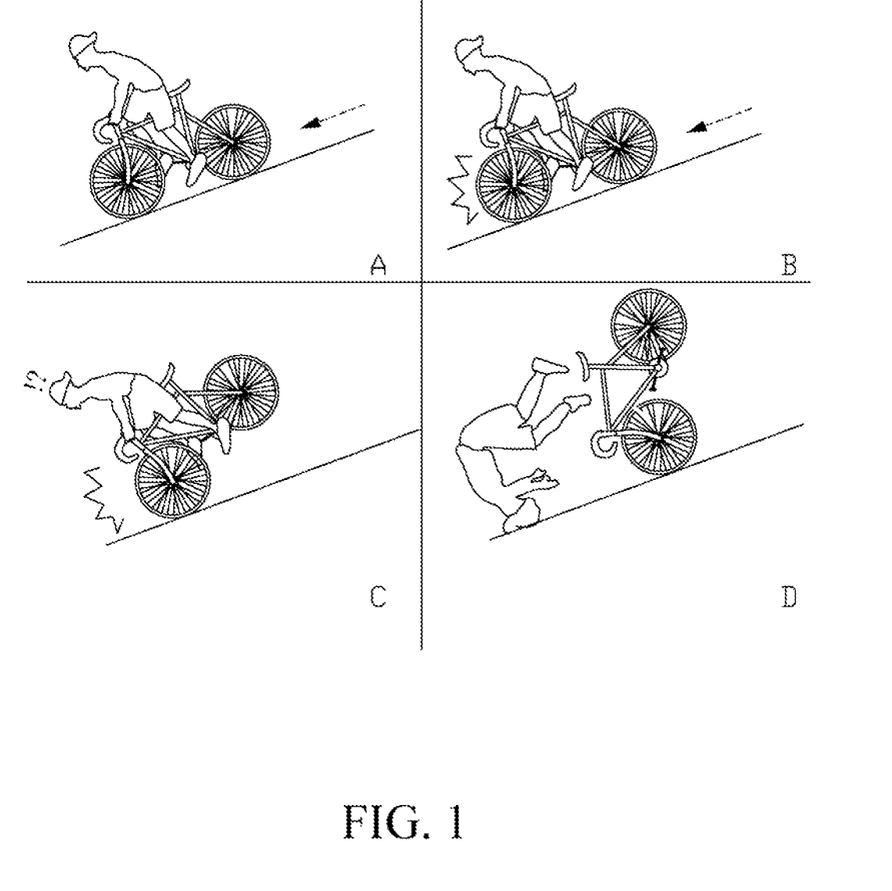
FIG. 1 is a schematic diagram of one example of a cycling accident.
Figure 2:
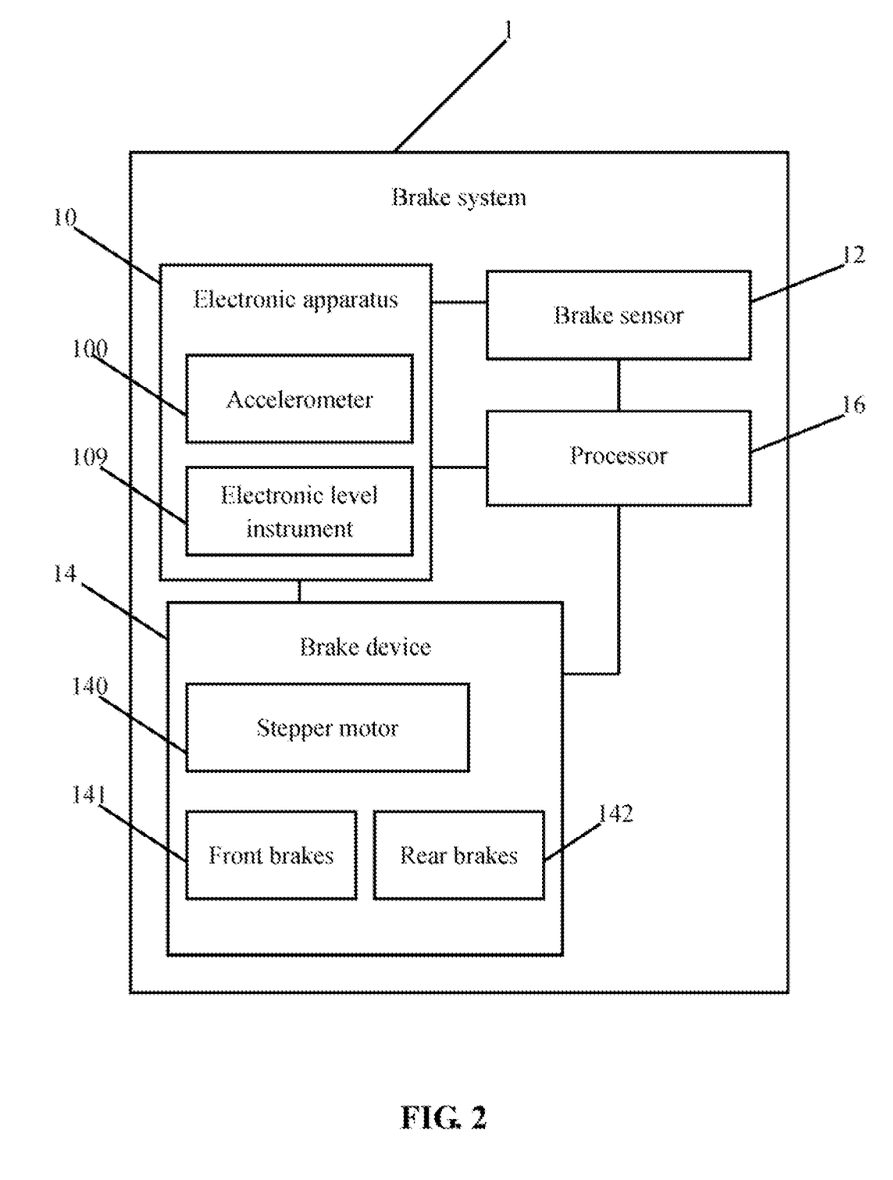
FIG. 2 is a block diagram of one embodiment of a brake system.

FIG. 2 is a block diagram of one embodiment of a brake system 1. The brake system 1 may include an electronic apparatus 10, a plurality of brake sensors 12 (only one shown in FIG. 2), a brake device 14, and a processor 16. An example of an improper brake operation, as shown in FIG. 1, can result in a serious accident when a user (e.g. rider) applies a brake of a front wheel of a bicycle when the bicycle is going downhill (e.g., downsloped). The brake system 1 may be used to detect improper brake operations of the user, terminate the improper brake operation, and control the brake device 14 to brake the bicycle safely. Detailed descriptions are provided below.

In some embodiments, the brake sensors 12, the brake device 14, and the processor 16 are connected to a circuit using cables, such as electrical wires, or Universal Serial Bus (USB) cables, for example. The electronic apparatus 10 may be positioned on a bracket of the bicycle when the brake system 1 needs to be powered on. The electronic apparatus 1 may be connected to the circuit through the electrical wire or the USB cable, to transmit specific data. The bracket may be secured on the bicycle to avoid dropping of the electronic apparatus 10.

In some embodiments, the brake system 1 may further include a power supply to supply power to the circuit composed of the brake sensors 12, the brake device 14, and the processor 16. The power supply, such as batteries, may provide a control to turn the power supply on and off. In other embodiments, the electronic apparatus 10 may supply power to the circuit of the brake sensors 12, the brake device 14, and the processor 16 without the power supply.

In some embodiments, the electronic apparatus 10 may detect cycling statuses of the bicycle and brake operations, and send brake commands to the brake device 14 to perform a safe brake operation. In some embodiments, the cycling status of the bicycle may represent that the bicycle is downsloped, upsloped, or cycling on flat ground. The electronic apparatus 10 may be a mobile phone, a personal digital assistant, for example. The electronic apparatus 10 includes an accelerometer 100 and an electronic level instrument 109. The accelerometer 100 may detect a gradient value of the electronic apparatus 10, the accelerometer 100 may be a gravity sensor. The electronic level instrument 109 may detect if the bicycle is downsloped or upsloped.

The brake device 14 may include front brakes 141, rear brakes 142, and a stepper motor 140. The front brakes 141 are fixed on a front wheel of the bicycle, and the rear brakes 142 are fixed on a rear wheel of the bicycle. The stepper motor 140 is an electric motor that may convert a pulsed digital input signal into mechanical movement. In some embodiments, the stepper motor 140 is connected to brake cables of the bicycle, to control the brake cables, for example, tightening or loosening the brake cables.

The brake sensors 12 may be fixed onto the front brakes 141 and the rear brakes 142 of the brake device 14. The brake sensors 12 may detect if the front brakes 141 and/or the rear brakes 142 are operated. In some embodiments, the brake sensors 12 may be displacement sensors to determine if the front brakes 141 or the rear brakes 142 are operated by detecting displacement data of the front brakes 141 or the rear brakes 142. In other embodiments, the brake sensors 12 may be hydraulic pressure sensors to determine if the front brakes 141 or the rear brakes 142 are operated by detecting pressure of the front brakes 141 or the rear brakes 142.

The at least one processor 16 may execute the brake commands sent by the electronic apparatus 10 to control the brake device 14.

Figure 3:
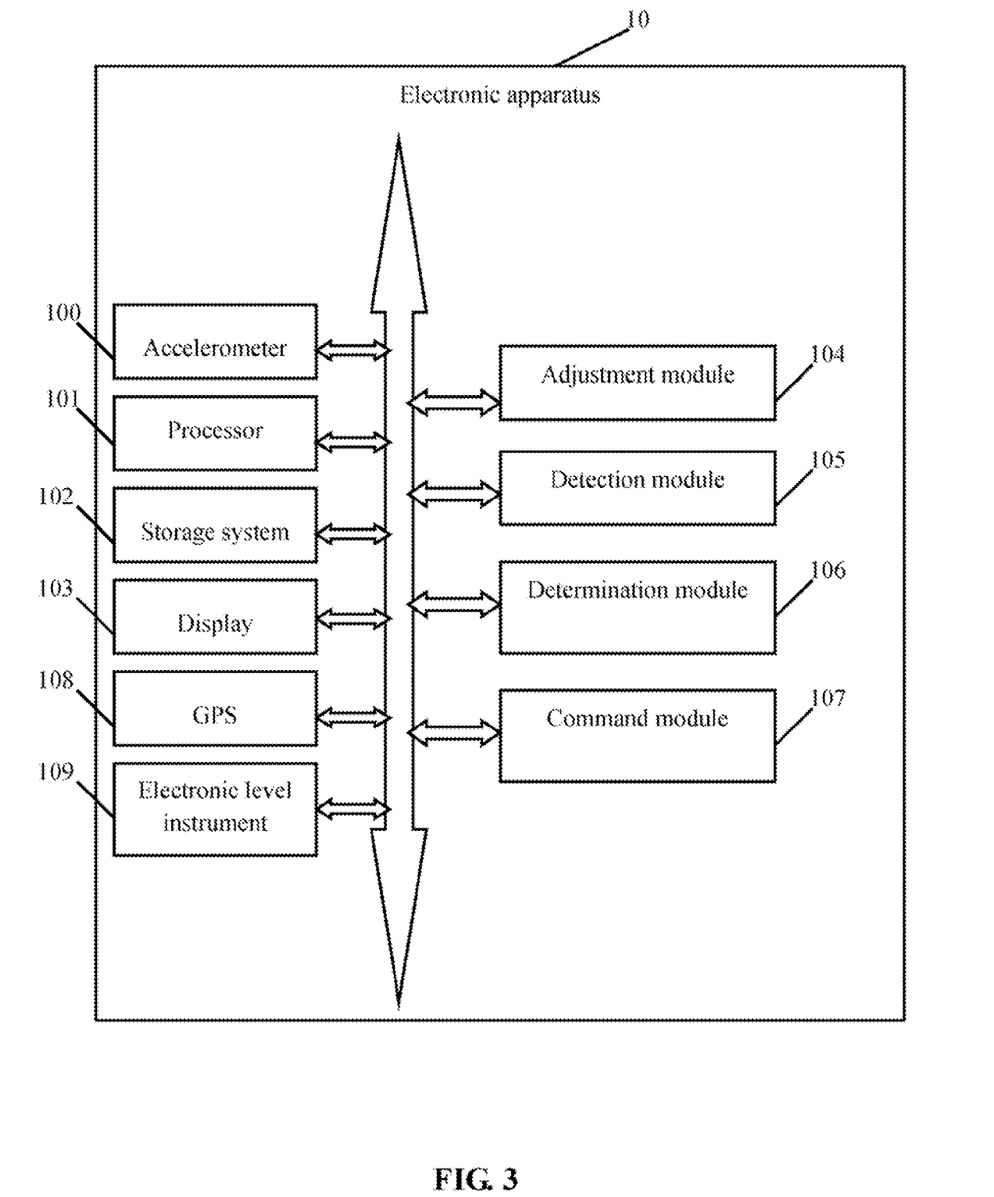
FIG. 3 is a block diagram of one embodiment of an electronic apparatus in the brake system of FIG. 2.

FIG. 3 is a block diagram of the electronic apparatus 10 in the brake system 1 of FIG. 2. The electronic apparatus 10 includes the accelerometer 100, at least one processor 101, a storage system 102, a display 103, a GPS 108, and the electronic level instrument 109. The at least one processor 101 executes one or more computerized operations of the electronic apparatus 10 and other applications, to provide functions of the electronic apparatus 10. The storage system 102 stores one or more programs, such as programs of the operating system, other applications of the electronic apparatus 10, and various kinds of data, such as detected data. In some embodiments, the storage system 102 may include a memory of the electronic apparatus 10 and/or an external storage card, such as a memory stick, a smart media card, a compact flash card, or any other type of memory card. The display 103 may output visible data. The GPS 108 may provide an electronic map and determine position information of the electronic apparatus 10.

The electronic apparatus 10 further includes an adjustment module 104, a detection module 105, a determination module 106, and a command module 107. The modules 104-107 may include computerized codes in the form of one or more programs stored in the storage system 102. The computerized codes include instructions executed by the at least one processor 101 to provide functions for modules 104-107. Details of these functions follow.

When the brake system 1 needs to be used, the electronic apparatus 10 is positioned on the bracket of the bicycle and connected to the circuit of the brake sensors 12, the brake device 14, and the processor 16 using the USB cable.

Figure 4:
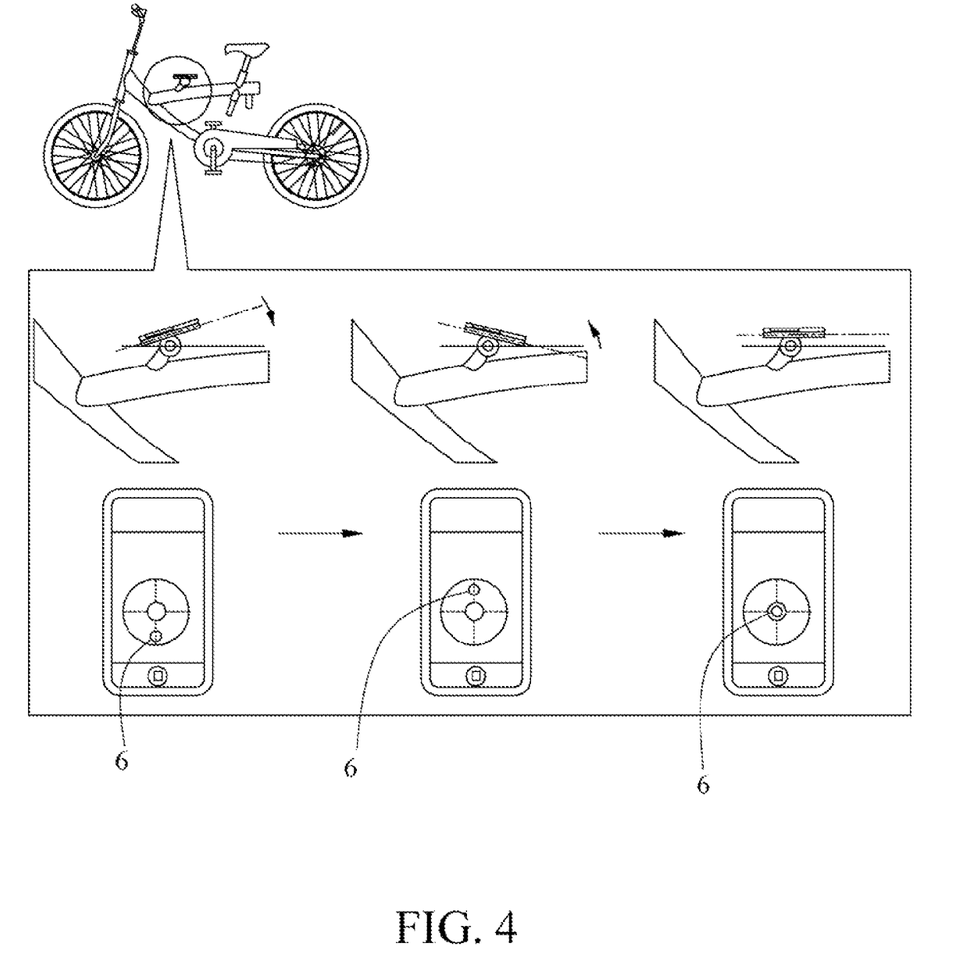
FIG. 4 is a schematic diagram of one embodiment of positions of the electronic apparatus of FIG. 3 on a bicycle.

Referring to FIG. 4, the bracket may be fixed on a transverse bar of the bicycle. In other embodiments, the bracket also may be fixed on a bicycle handle or any other position on the bicycle. The bracket needs to be leveled using the electronic level instrument 109, when the bicycle is still on the flat ground.

Figure 5:
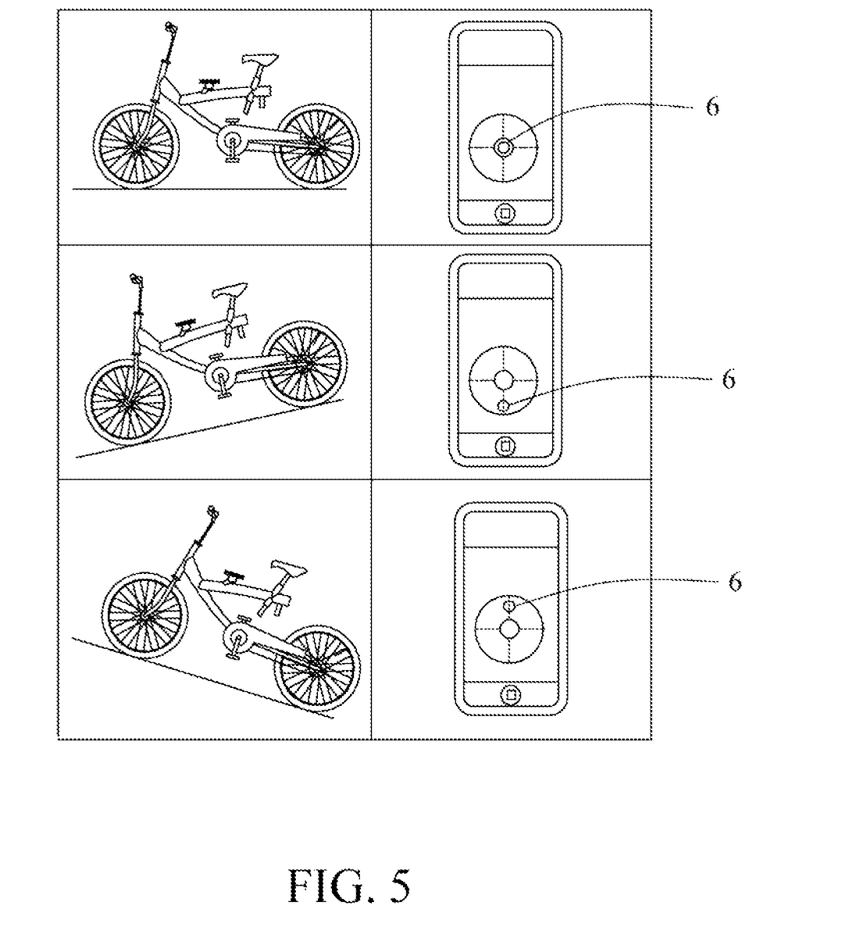
FIG. 5 is a schematic diagram of one embodiment of a gradient state of the electronic apparatus of FIG. 3.

The adjustment module 104 displays a gradient state of the electronic apparatus 10 on the display 103. For example, as shown in FIG. 4 and FIG. 5, the gradient state of the electronic apparatus 10 may be shown as a moveable air bubble 6 in a ring of the display 103. In some embodiments, different positions of the air bubble 6 represent different gradient values of the electronic apparatus 10. The gradient state may assist in determining the bracket needs to be adjusted.

The accelerometer 100 detects a gradient value of the electronic apparatus. The adjustment module 104 acquires the gradient value, and displays the gradient value on the display 103. When the gradient value of the electronic apparatus 10 changes, a position of the air bubble 6 also changes. In some embodiments, when the bicycle is downsloped, the bracket is inclined to left-lower, and the air bubble 6 is below an inner circle of the ring. When the bicycle is upsloped, the bracket is inclined to left-upper, and the air bubble 6 is above the inner circle of the ring. When the bicycle is on the flat ground, the bracket is horizontal, and the air bubble 6 is in the inner circle of the ring.

Thus, the bracket can be adjusted to level the electronic apparatus 10. The prompt information may be represented using other means, such as audible information, for example.

In some embodiments, when the electronic apparatus 10 is in the horizontal state after the above adjustment, the bicycle is determined to be in the horizontal state. That is, a gradient value of the bicycle is about the same as the gradient value of the electronic apparatus 10.

When the brake system 1 is powered on, the electronic level instrument 109 determines if the electronic apparatus 10 is upward sloping or downward sloping. For example, if the electronic apparatus 10 is downward sloping, the detection module 105 determines that the bicycle is downsloped. If the electronic apparatus 10 is upward sloping, the detection module 105 determines that the bicycle is upsloped.

In other embodiments, the detection module 105 marks all slopes on the electronic map provided by the GPS 8, for example, records position information of the slops on the electronic map, highlights or tags the slops on the electronic map. The detection module 105 further determines if the bicycle is downsloped by comparing position information (e.g., altitudes) acquired from the GPS when detected that the bicycle has reached the marked slopes.

If the bicycle is downsloped, the detection module 105 acquires the gradient value of the electronic apparatus 10 from the accelerometer 100. In some embodiments, the gradient value may be an angle between the electronic apparatus 10 and the vertical. The detection module 105 predetermines a gradient threshold, such as 45°, and determines if the gradient value of the electronic apparatus 10 exceeds or equals the gradient threshold.

If the gradient value of the electronic apparatus 10 exceeds or equals the gradient threshold, the brake sensors 12 detect brake operations of the bicycle, and transmit data of the brake operations to the processor 16. The brake operations may represent that the front brakes 141 are operated prior to the rear brakes 142, or the front brakes 141 are only operated, or the rear brakes 142 are only operated. The processor 16 converts the data of the brake operations into Extensible Markup Language (XML) data, and transmits the XML data to the electronic apparatus 10 through the USB cable. The detection module 105 acquires the XML data.

In other embodiments, the process 16 may transmit the data of the brake operations to the electronic apparatus 10 without any conversion, and the processor 101 of the electronic apparatus converts the data of the brake operations to the XML data. The determination module 106 determines if the front brakes 141 are operated prior to operations of the rear brakes 142, or if the front brakes 141 are only operated according to the brake operations.

In the first embodiment, the command module 107 controls the brake device 14 to tighten and loosen the brake cables of the front wheel and the rear wheel of the bicycle repeatedly for a predetermined number times within a predetermined time period, according to the brake command. For example, if the predetermined time period is five seconds, and the predetermined number times is twenty times, the stepper motor 140 of the brake device 14 repeatedly tightens and then loosens the brake cables twenty times in five seconds. Thus, the bicycle may slow down safely.

In the second embodiment, the command module 107 controls the brake device 14 to loosen the brake cables of the front wheel and tighten the brake cables of the rear wheel, according to the brake command. The brake command may be preset using the XML, and be modified, canceled, or newly added according to requirements.

Figure 6:
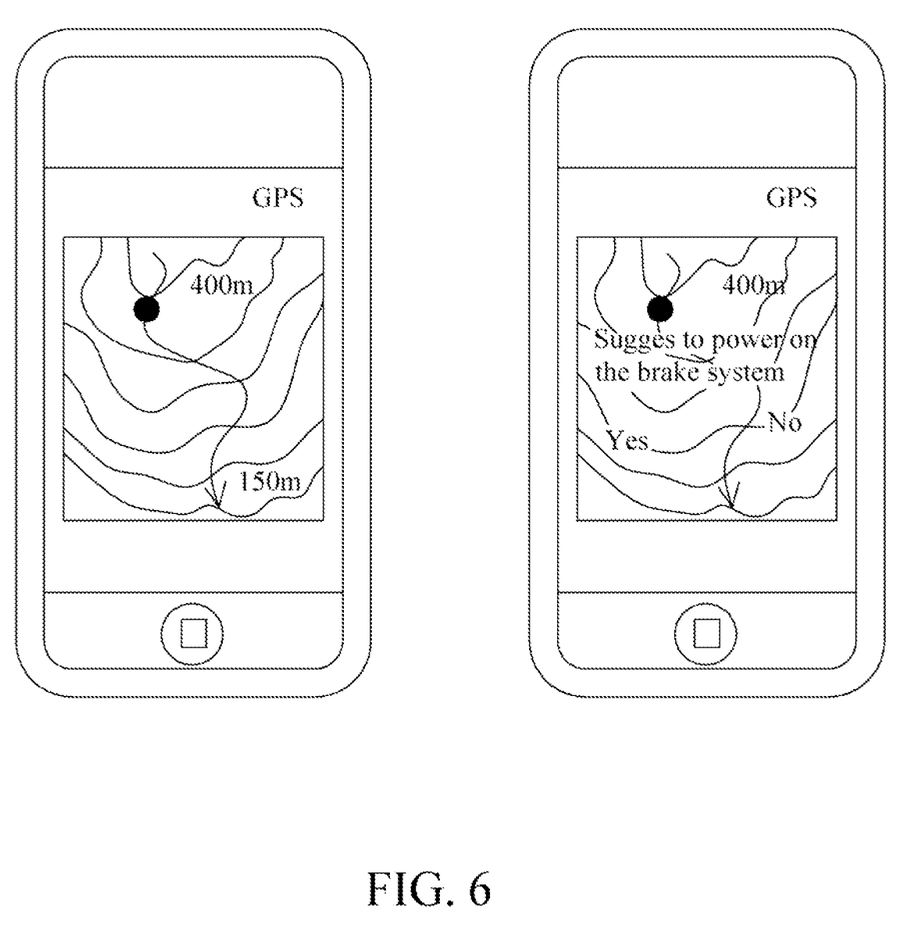
FIG. 6 is a schematic diagram of one embodiment of the electronic apparatus of FIG. 3 including a global position system (GPS).

If the brake system 1 has the power supply, for the purpose to save power, the brake system 1 may be powered on when the detection module 105 determines that the bicycle is downsloped. As shown in FIG. 6, the electronic apparatus 10 may display a prompt message or output audio message, to prompt the user to open the brake system 1.

In another embodiments, the electronic apparatus 10 may include a gyroscope device to instead the accelerometer 100 for detection of the gradient value.

Figure 7:
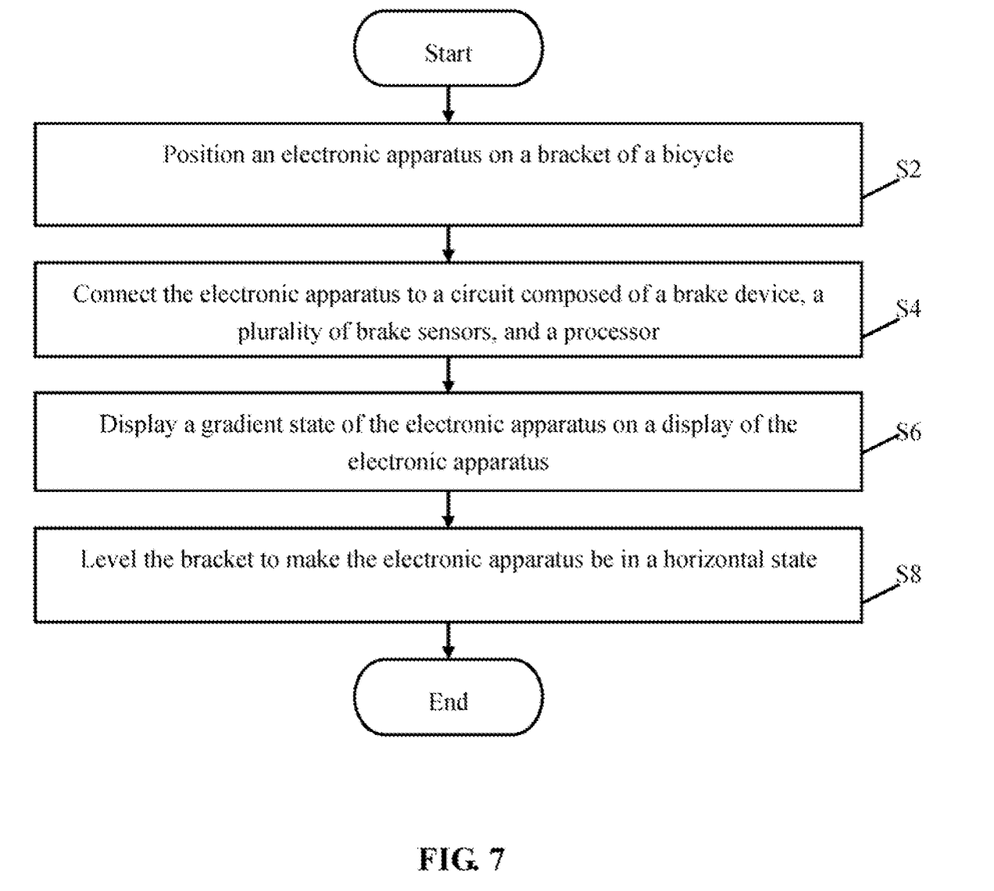
FIG. 7 is a flowchart of one embodiment of a method for adjusting the positions of the electronic apparatus.

FIG. 7 is a flowchart of a method for adjusting the positions of the electronic apparatus 10. Depending on the embodiment, additional blocks may be added, others removed, and the ordering of the blocks may be replaced.

In block S2, the electronic apparatus 10 is positioned onto the bracket of the bicycle.

In block S4, the electronic apparatus 10 is connected to the circuit of the brake sensors 12, the brake device 14, and the processor 16 using the USB cable.

In block S6, the adjustment module 104 displays a gradient state of the electronic apparatus 10 on the display 103.

In block S8, the bracket is leveled to make the electronic apparatus 10 in a horizontal state using the electronic level instrument 109 according to the gradient state of the electronic apparatus 10.

Figure 8:
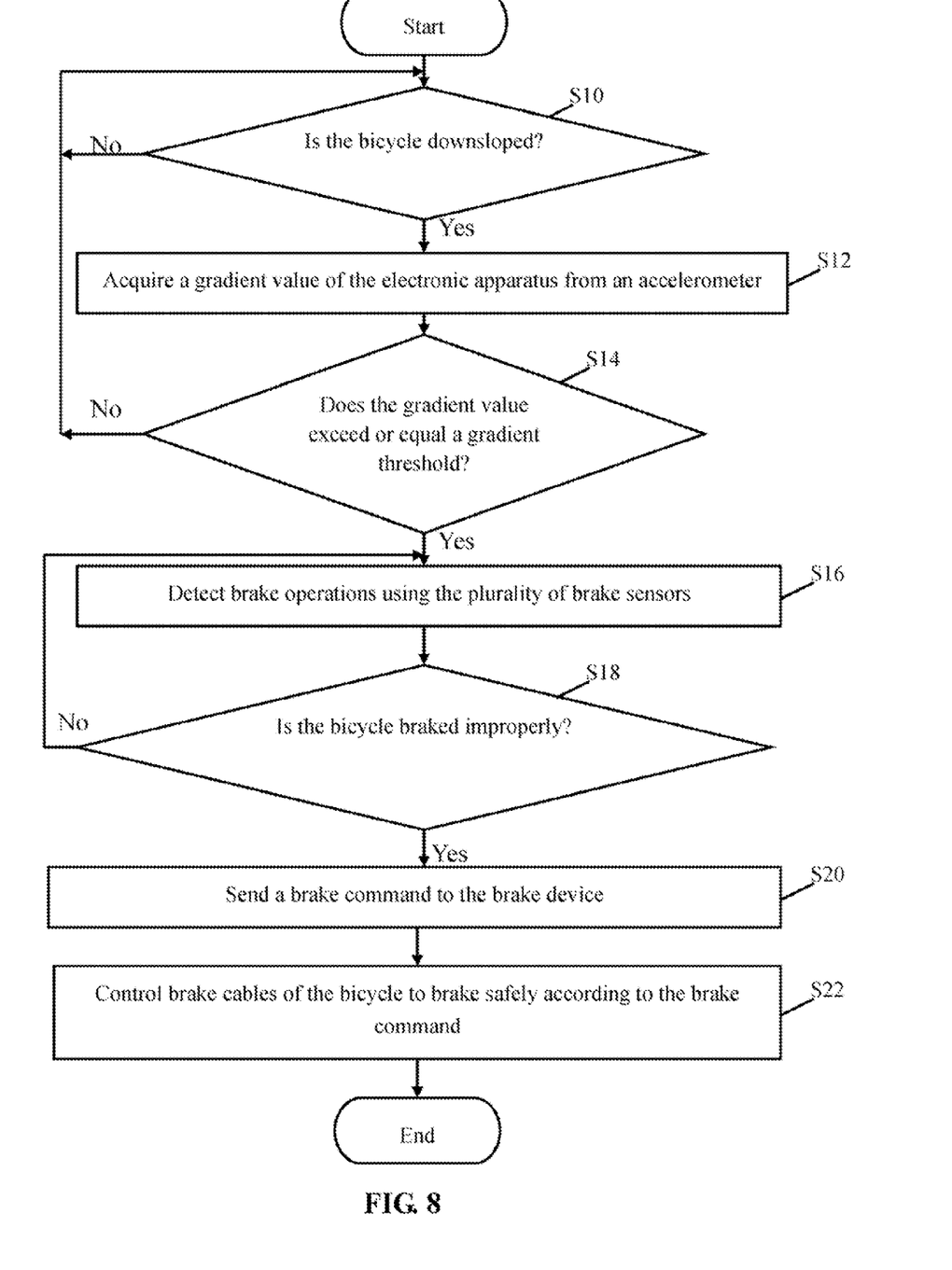
FIG. 8 is a flowchart of one embodiment of a brake method.

FIG. 8 is a flowchart of one embodiment of a brake method. Depending on the embodiment, additional blocks may be added, others removed, and the ordering of the blocks may be replaced.

In block S10, the detection module 105 determines if the bicycle is downsloped by detecting if the electronic apparatus 10 is downward sloping using the electronic level instrument 109. If the electronic apparatus 10 is upward sloping, the procedure returns to block S10. If the electronic apparatus 10 is downward sloping, the detection module 105 determines that the bicycle is downsloped, and the procedure goes to block S12.

In block S12, the detection module 105 acquires the gradient value of the electronic apparatus 10 from the accelerometer 100.

In block S14, the detection module 105 determines if the gradient value exceeds or equals the gradient threshold (e.g., 45°). If the gradient value is less than the gradient threshold, the procedure returns to block S10.

If the gradient value exceeds or equals the gradient threshold, in block S16, the detection module 105 acquires the data of the brake operations from the brake sensors 12.

In block S18, the determination module 106 determines if the bicycle is braked improperly. As mentioned above, if the front brakes 141 are operated prior to the operations of the rear brakes 142, or if the front brakes 141 are only operated according to the data of the brake operations, the bicycle is braked improperly. If the bicycle is braked properly, the procedure returns to block S16. If the bicycle is braked improperly, in block S20, the command module 107 sends a brake command to the brake device 14.

In block S22, the stepper motor 140 of the brake device 14 controls the brake cables to brake safely according to the brake command. As mentioned above, the brake device 14 may tighten and loosen the brake cables of the front wheel and the rear wheel of the bicycle repeatedly for a predetermined number times within a predetermined time period, or loosens the brake cables of the front wheel and tightens the brake cables of the rear wheel, according to the brake command.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A brake method of a bicycle using a brake system, the brake system comprising an electronic apparatus positioned on a bracket of the bicycle, a brake device, and a plurality of brake sensors, the method comprising:
    adjusting the bracket to make the electronic apparatus be in a horizontal state using an electronic level instrument of the electronic apparatus;
    marking slopes on an electronic map provided by a global position system (GPS) of the electronic apparatus;
    determining whether a gradient value of the electronic apparatus detected by an accelerometer of the electronic apparatus exceeds or equals a predetermined gradient value under the condition that the bicycle is determined to be descending by comparing position information acquired from the GPS when the bicycle reaches the marked slopes;
    determining whether the bicycle is braking improperly according to brake operations detected by the plurality of brake sensors, when the gradient value exceeds or equals the predetermined gradient value;
    determining that the bicycle is braking improperly when front brakes of the brake device are operated prior to operations of the rear brakes, and sending a brake command to the brake device to terminate an improper brake operation; and
    tightening and then loosening brake cables of a front wheel and a rear wheel of the bicycle repeatedly for a predetermined number times within a predetermined time period using the brake device according to the brake command.

2. The method according to claim 1, wherein the bicycle is determined to be descending when the electronic apparatus is downward sloping detected by the electronic level instrument.

3. The method according to claim 1, wherein the bicycle is also determined to be braking improperly when the front brakes are only operated.

4. The method according to claim 1, wherein the controlling step comprises:
    controlling the brake device to loosen the brake cables of the front wheel and tighten the brake cables of the rear wheel according to the brake command.

5. The method according to claim 1, further comprising:
    displaying a gradient state of the electronic apparatus on a display of the electronic apparatus.

6. The method according to claim 5, wherein a moveable air bubble in a ring of the display is used to represent the gradient state of the electronic apparatus, and different positions of the air bubble represent different gradient values of the electronic apparatus.

7. The method according to claim 1, wherein the slopes are highlighted or tagged on the electronic map, and the position information acquired from the GPS comprises altitudes.

8. A brake system of a bicycle, comprising:
    a brake device;
    a plurality of brake sensors; and
    an electronic apparatus positioned on a bracket of the bicycle, the electronic apparatus comprising an electronic level instrument, an accelerometer, a storage system, at least one processor; and
    one or more programs stored in the storage system and being executable by the at least one processor, the one or more programs comprising:
    an adjustment module that adjusts the bracket to make the electronic apparatus be in a horizontal state using an electronic level instrument of the electronic apparatus;
    a detection module that marks slopes on an electronic map provided by a global position system (GPS) of the electronic apparatus, and determines whether a gradient value of the electronic apparatus detected by the accelerometer exceeds or equals a predetermined gradient value under the condition that the bicycle is determined to be descending by comparing position information acquired from the GPS when the bicycle reaches the marked slopes;
    a determination module that determines whether the bicycle is braking improperly according to brake operations detected by the plurality of brake sensors when the gradient value exceeds or equals the predetermined gradient value, and determines that the bicycle is braking improperly when front brakes of the brake device are operated prior to operations of the rear brakes; and
    a command module that sends a brake command to the brake device to terminate an improper brake operation when the bicycle is braking improperly, and tightens and then loosens brake cables of a front wheel and a rear wheel of the bicycle repeatedly for a predetermined number times within a predetermined time period by the brake device according to the brake command.

9. The brake system according to claim 8, wherein the detection module determines that the bicycle is descending when the electronic apparatus is downward sloping detected by the electronic level instrument.

10. The brake system according to claim 8, wherein the determination module also determines that the bicycle is braking improperly when the front brakes are only operated.

11. The brake system according to claim 8, wherein the command module controls the brake device to loosen the brake cables of the front wheel and tighten the brake cables of the rear wheel according to the brake command.

12. The brake system according to claim 8, wherein the adjustment module displays a gradient state of the electronic apparatus on a display of the electronic apparatus.

13. The brake system according to claim 12, wherein a moveable air bubble in a ring of the display is used to represent the gradient state of the electronic apparatus, and different positions of the air bubble represent different gradient values of the electronic apparatus.

14. The brake system according to claim 8, wherein the detection module marks the slopes on the electronic map by highlighting or tagging the slopes, and the position information acquired from the GPS comprises altitudes.

15. A non-transitory storage medium storing a set of instructions, the set of instructions capable of being executed by a processor to perform a brake method of a bicycle using a brake system, the brake system comprising an electronic apparatus positioned on a bracket of the bicycle, a brake device, and a plurality of brake sensors, the method comprising:

adjusting the bracket to make the electronic apparatus be in a horizontal state using an electronic level instrument of the electronic apparatus;

marking slopes on an electronic map provided by a global position system (GPS) of the electronic apparatus;

determining whether a gradient value of the electronic apparatus detected by an accelerometer of the electronic apparatus exceeds or equals a predetermined gradient value under the condition that the bicycle is determined to be descending by comparing position information acquired from the GPS when the bicycle reaches the marked slopes;

determining whether the bicycle is braking improperly according to brake operations detected by the plurality of brake sensors, when the gradient value exceeds or equals the predetermined gradient value;

determining that the bicycle is braking improperly when front brakes of the brake device are operated prior to operations of the rear brakes, and sending a brake command to the brake device to terminate an improper brake operation; and tightening and then loosening brake cables of a front wheel and a rear wheel of the bicycle repeatedly for a predetermined number times within a predetermined time period using the brake device according to the brake command.

16. The non-transitory storage medium as claimed in claim 15, wherein the bicycle is determined to be descending when the electronic apparatus is downward sloping detected by the electronic level instrument.

17. The non-transitory storage medium as claimed in claim 15, wherein the bicycle is also determined to be braking improperly when the front brakes are only operated.

18. The non-transitory storage medium as claimed in claim 15, wherein the controlling step comprises:

controlling the brake device to loosen the brake cables of the front wheel and tighten the brake cables of the rear wheel according to the brake command.

19. The non-transitory storage medium as claimed in claim 15, wherein the slopes are highlighted or tagged on the electronic map, and the position information acquired from the GPS comprises altitudes.

20. The non-transitory storage medium as claimed in claim 15 wherein the method further comprises:

displaying a gradient state of the electronic apparatus on a display of the electronic apparatus, the gradient state being represented as a moveable air bubble in a ring of the display, and different positions of the air bubble representing different gradient values of the electronic apparatus.

* * * * *